United States Patent Office 2,967,887
Patented Jan. 10, 1961

2,967,887

PROCESS FOR THE PREPARATION OF PHENYL-MERCAPTO-PHENYLAMINES AND PHENYL-MERCAPTO-NAPHTHYLAMINES

William E. Hanford and John W. Copenhaver, Short Hills, and Horace R. Davis, Jr., Cedar Grove, N.J., assignors to The M. W. Kellogg Company, Jersey City, N.J., a corporation of Delaware No Drawing. Filed Apr. 30, 1956, Ser. No. 581,286

5 Claims. (Cl. 260—580)

This invention relates to a new and novel method for preparing amino aromatic thioethers, some of which are new compositions of matter. More particularly, this invention relates to a method of preparing amino aromatic thioethers by the reaction of a mercaptan and an ortho-substituted nitro aromatic compound in alkaline media.

The novel compounds according to this invention are represented by the structural formulae:

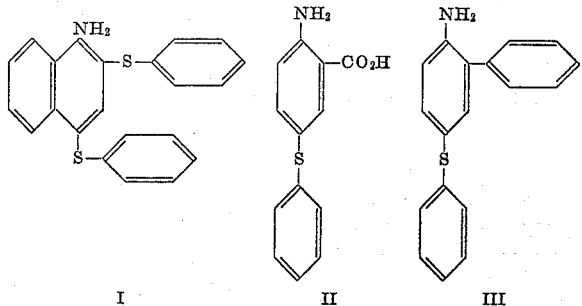

Amino substituted thio ethers of the

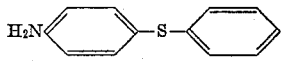

type have been prepared from chloroaromatic nitro compounds and thiophenols by replacing the chloro group with an alkylmercapto or arylmercapto group in alkaline solution and then reducing the nitro group with zinc or tin in acid solution.

The reduction of aromatic nitro and nitroso compounds has been extensively studied and it is well known that from this reaction, according to the conditions, a variety of products may be obtained. Generally, the controlling factors are the type of reducing agent used and the acidity of the reacting mixture. In alkaline solutions and with a mild reducing agent, such as dry iron filings, the nitro compound is reduced to the nitroso compound, which, through condensation is further reduced to the corresponding azo and azoxy compound.

It has now been found that the reaction of a mercaptan with certain ortho-substituted nitrobenzenes in alkaline solution does not follow the described reaction pattern, but produces, in one step, a thioether which is substituted in the para position of the aromatic ring by an amino group and in the meta position by another group.

The compounds according to this invention are white crystalline solids, weakly basic but not soluble in dilute acids, which can be acetylated and which form salts with mineral acids in anhydrous media. They are useful as insecticides, dyestuff intermediates and chemical intermediates.

In accordance with this invention, the members of this novel class of substances are prepared by treating an ortho substituted nitro or nitroso aromatic compound with a mercaptan in alkaline solution. The starting materials involved in this synthesis embrace all of the compounds in the mercaptan group. The ortho substituted nitro or nitroso aromatic compound may be one of the nitrobenzenes which are substituted in the ortho position, and the corresponding nitroso compounds. Considered to be in this class are such compounds as alpha-nitronaphthalene, ortho-nitrobiphenyl, ortho-aminonitrobenzene, ortho-alkylnitrobenzenes, ortho-arylnitrobenzenes, the corresponding nitroso compounds and other compounds having a group substituted in the position ortho to the nitro or nitroso group on the aromatic ring.

We have found that the process of the invention may be accomplished by causing a mixture consisting of a nitro or nitroso aromatic compound, a mercaptan, and an alkali, preferably in aqueous phase, to react at temperatures between 25° C. and 250° C. and preferably between 60° C. and 170° C.; thereafter recovering by convenient and conventional methods the product, one of the meta substituted amino thioethers.

The ratio of mercaptan to the nitro or nitroso aromatic compound should be above 2:1 and preferably between 2:1 and 8:1 depending upon the nature of the mercaptan used. Increased ratios of alkyl mercaptan appear to slightly decrease the yield, while increased ratios of aromatic mercaptans tend to slightly increase the yield. The optimum concentration of the mercaptan, is, however, about four moles per mole of the nitro or nitroso aromatic compound. The mercaptan serves a two-fold purpose in that it not only substitutes into the aromatic ring, but also reduces the nitrogen and oxygen containing group to a primary amine.

Some type of basic material is essential to this synthesis and the hydroxides of the alkali metals are preferable. Nevertheless, organic basic materials, such as alkali metal alcoholates or amines, may also be used, although they are not as effective as the inorganic bases for promoting the substitution of the mercaptan group into the aromatic nucleus. The quantity of base used may range from a molar concentration slightly in excess of the mercaptan molar concentration to a saturated solution of the base in the solvent employed. A molar ratio of alkali to mercaptan greater than 4:1 is preferable in these reactions.

Water is the most satisfactory medium in which to carry out the reaction. Alcohols, liquid amines, or inert solvents may be used if desired.

The reaction may be performed at temperatures between 25° C. and 250° C. or below the decomposition temperature of the desired product. Although reaction does take place at temperatures below 25° C., the rate of reaction is not sufficiently great to produce any yield of the product within a reasonable period of time. At temperatures above about 250° C., excessive decomposition of the desired product occurs. For convenience in operation and to obtain the most desirable reaction rates, temperatures ranging from 60° C. to 175° C. are preferable for the synthesis of the desired products from nitro compounds. Similar reactions carried out with nitroso compounds as the starting material should be operated at temperatures between 25° C. and 100° C.

More specifically the procedure is as follows: The nitro or nitroso aromatic compound, the mercaptan, and the aqueous alkali are placed in a vessel. The vessel may be glass if the temperature is not to exceed 105° C. If the reaction is to take place at about room temperature, no additional equipment is required. At temperatures above room temperature, a reflux condenser should be attached. At temperatures higher than 105° C., the water tends to boil out of the reaction zone and it therefore becomes necessary to use some type of pressure equipment, designed more to retain the water vapor in the system than to exert pressure on the area of reaction. Equipment such as a sealed bomb, an autoclave, or water tight apparatus for continuous operation may be employed. Throughout the temperature range agitation has been found to be advantageous but not essential for the reaction to proceed. The preferred method is to heat the mixture containing an aromatic nitro starting material to a temperature between 60° C. and 175° C. At temperature between 80° C. and 105° C. the reaction will go to completion in 20 to 48 hours, while at a temperature of 140° C. the required reaction time is 5 to 15 hours. Synthesis from aromatic nitroso starting materials requires 1 to 4 hours at temperatures of 25° C. to 50° C.

Upon the completion of the reaction, the unreacted aromatic nitro and nitroso compound and/or the extraneous disulfide of the mercaptan is removed by steam distillation or any other convenient method. The para-alkylmercapto and para-arylmercapto substituted azo and azoxy compounds are extracted with a suitable solvent or any other applicable methods. The products are then recovered by recrystallization or chromatography.

To facilitate a fuller and more complete understanding of the subject matter of this invention and how the herein described compounds can be prepared by practice of the process, certain specific examples follow, but these examples are provided by way of illustration and not by way of limitation.

EXAMPLE I

*Alpha-nitronaphthalene and thiophenol*

A mixture consisting of 0.10 mole of alpha-nitronaphthalene, 0.40 mole of thiophenol, 480 ml. of water and 3 moles of sodium hydroxide was placed in a glass flask. A reflux condenser and a mechanical stirrer were connected. The mixture was then heated to a temperature of 102° C. and the reaction of the components proceeded for twelve hours. The product 1-amino-2,4-bis(phenylmercapto)naphthalene

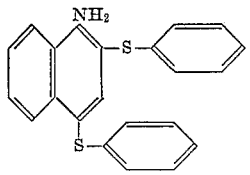

was then extracted from the residue with ether and thereafter a 20% yield was recovered through chromatography.

The product (M.P. 130–132° C.) was analyzed for its element content and the results obtained agreed well with the calculated theoretical values.

COMPOSITION

| Elements | Percentages | |
|---|---|---|
|  | found | calculated |
| Carbon | 73.07 | 73.49 |
| Hydrogen | 4.55 | 4.77 |
| Nitrogen | 3.81 | 3.90 |
| Sulfur | 18.00 | 17.84 |

The compound was further identified by treating it with acetic anhydride to produce 1-acetamino-2,4-bis(phenylmercapto)naphthalene, melting point 146° C. to 147° C.

EXAMPLE II

*Ortho-nitrotoluene and thiophenol*

A mixture consisting of 0.20 mole of orthonitrotoluene, 0.80 mole of thiophenol, 480 ml. of water and 3 moles of sodium hydroxide was placed in a glass flask. A reflux condenser and a mechanical stirrer were connected. The mixture was then heated to a temperature of 102° C. and the reaction of the components proceeded for twelve hours. At the end of that time, the mixture was steam distilled in a conventional manner to remove the excess ortho-nitrotoluene, and extracted to remove diphenyl disulfide and any neutral material. The residue of the steam distillation was then acidified and steam distilled to remove any unreacted thiophenol. The product 2-amino-5-phenylmercaptobenzoic acid was then extracted from

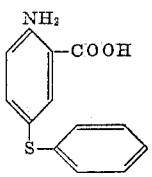

the residue of the distillation with ether and thereafter a 4% yield, based on the o-nitrotoluene charged, was recovered through recrystallization.

The product (M.P. 211–2° C.) was analyzed for its element content and the results obtained agreed well with the calculated theoretical values.

COMPOSITION

| Elements | Percentages | |
|---|---|---|
|  | found | calculated |
| Carbon | 63.43 | 63.65 |
| Hydrogen | 4.60 | 4.52 |
| Sulfur | 12.68 | 12.96 |

The product was further identified by treating it with hypophosphoric acid to produce m-phenylmercaptobenzoic acid, having a neutral equivalent of 230 and a melting point of 108°–109° C.

EXAMPLE III

*Ortho-nitrobiphenyl and thiophenol*

A mixture consisting of 0.05 mole of ortho-nitrobiphenyl, 0.20 mole of thiophenol, 80 ml. of water and 0.5 mole of sodium hydroxide was placed in a steel bomb. The mixture was then heated to a temperature of 150° C. and the reaction of the components proceeded for twelve hours. The product 2-amino-5-phenylmercaptobiphenyl was then extracted from the residue with ether and thereafter a 12% yield, based on the o-nitrobiphenyl, was recovered through chromatography.

The product (M.P. 73° C.) was analyzed for its element content and the results obtained agreed well with the calculated theoretical values.

COMPOSITION

| Elements | Percentages | |
|---|---|---|
|  | found | calculated |
| Carbon | 78.17 | 77.94 |
| Hydrogen | 4.84 | 5.45 |
| Sulfur | 11.71 | 11.56 |

EXAMPLE IV 2,4-bis(phenylmercapto)-1-napthylamine (M.P. 130–132° C., prepared by the reaction of 1-nitronaphthalene with thiophenol in aqueous sodium hydroxide) was dissolved with cooling in a minimum of concentrated sulfuric acid; about 10 ml. of acid were required per gram of amine. The solution was then cautiously diluted to ten times its original volume by the addition of ice and the white solid, which precipitated in the early stages of dilution, redissolved as the final volume was reached. To the cold solution at a temperature of 0° C. was added the theoretical amount of sodium nitrite (0.2 gram per gram of amine), and a yellow solid quickly precipitated.

When this mixture was added to a solution of β-napthol in a large excess of sodium hydroxide, a dark solution resulted which dyed wool or cotton cloth a bright lavender color. When resorcinol was used instead of β-napthol the cloth was dyed a red color.

Other dyes can also be similarly prepared from other amines, prepared according to this invention, by using a variety of known coupling agents.

This application is a continuation-in-part of copending application S.N. 282,717 filed April 16, 1952, now abandoned.

We claim:
1. A process which comprises; reacting in an alkaline medium at a temperature in the range of between about 25° C. and about 250° C., a thiophenol having only carbon and hydrogen substituents in the phenyl portion thereof and a compound selected from the group consisting of

and

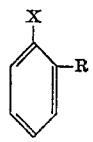

in which X is a radical selected from the group consisting of the nitro radical and the nitroso radical and R is a radical having not in excess of 20 carbon atoms and is selected from the group consisting of an alkyl radical, the phenyl radical, the carboxyl radical and the amino radicals, to produce the corresponding compounds selected from the group consisting of a phenylmercaptophenylamine and a phenylmercapto-naphthylamine free of nitro substitution.

2. A process which comprises; reacting in an alkaline medium at a temperature in the range of between about 60° C. and about 170° C., thiophenol and a compound having the formula selected from the group consisting of

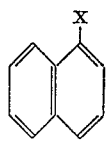

and

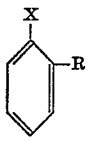

in which X is a radical selected from the group consisting of the nitro radical and the nitroso radical and R is a radical having not in excess of 20 carbon atoms and is selected from the group consisting of an alkyl radical, the phenyl radical, the carboxyl radical and the amino radicals, to produce the corresponding compounds selected from the group consisting of a phenylmercaptophenylamine and a phenylmercapto-naphthylamine free of nitro substitution.

3. The process of claim 1 wherein the molar ratio of said thiophenol to said compound selected from the group consisting of

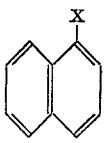

and

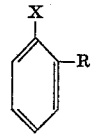

is greater than 2:1.

4. The process of claim 2 wherein the molar ratio of said thiophenol to said compound selected from the group consisting of

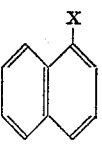

and

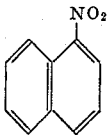

is between about 2:1 and about 8:1.

5. A process which comprises reacting, in an alkaline medium, at a temperature between about 25° C. and about 250° C. a thiophenol having only carbon and hydrogen substituents in the phenyl portion thereof and a compound having the formula to produce the corresponding phenylmercapto-naphthylamine.

References Cited in the file of this patent
UNITED STATES PATENTS
2,350,900   Johnson _____ June 6, 1944
FOREIGN PATENTS
116,951   Germany _____ June 21, 1899
695,164   Great Britain _____ Aug. 5, 1953

OTHER REFERENCES
Mayer: Deutsche Chemische Gesellschaft (Berichte), vol. 42, pages 3046–3067 (page 3066 relied on), (1909).
Zincke et al.: Annalen, vol. 391, page 57–88 (1912).
Zincke: Annalen, vol. 400, pages 1–27 (1913).
Zincke: Annalen, vol. 406, pages 103–126 (1914).
Beilstein, Band XIII, Vierte Auflage, Seite 595 (1930).
Donleavy et al.: Journal of the American Chemical Society, vol. 69, pages 1781–1784 (page 1783 relied on), (1947).
Doub et al.: Journal of the American Chemical Society, vol. 73, pages 903–906 (1951).